US012293678B2

(12) United States Patent
Kelly

(10) Patent No.: US 12,293,678 B2
(45) Date of Patent: May 6, 2025

(54) POP-UP WITH SLIDE LOCK

(71) Applicant: American Greetings Corporation, Cleveland, OH (US)

(72) Inventor: Charles Robert Kelly, Amherst, OH (US)

(73) Assignee: American Greetings Corporation, Cleveland, OH (US)

( * ) Notice: Subject to any disclaimer, the term of this patent is extended or adjusted under 35 U.S.C. 154(b) by 367 days.

(21) Appl. No.: 17/897,573

(22) Filed: Aug. 29, 2022

(65) Prior Publication Data

US 2024/0071258 A1 Feb. 29, 2024

(51) Int. Cl.
*G09F 1/06* (2006.01)
*A63H 33/16* (2006.01)
*A63H 33/38* (2006.01)
*G09F 15/00* (2006.01)

(52) U.S. Cl.
CPC ............... *G09F 1/06* (2013.01); *A63H 33/16* (2013.01); *A63H 33/38* (2013.01); *G09F 15/0068* (2013.01)

(58) Field of Classification Search
CPC ........ A63H 33/16; A63H 33/38; A63H 33/42; G09F 1/06; G09F 1/08
See application file for complete search history.

(56) References Cited

U.S. PATENT DOCUMENTS 1,698,731 A * 1/1929 Otto ......................... A63H 3/52 446/79
3,456,380 A * 7/1969 Cameron ............... A63H 33/38 281/15.1
5,259,133 A * 11/1993 Burtch ................. B42D 15/045 40/124.08
5,383,292 A * 1/1995 Whittredge ............. G09F 19/00 446/151
5,416,993 A * 5/1995 Shields ...................... G09F 1/12 40/781
5,450,680 A * 9/1995 Bromberg ................. G09F 1/08 40/124.08
5,933,989 A * 8/1999 Volkert ...................... G09F 1/06 446/148
5,961,149 A 10/1999 Hunt
6,892,876 B1 * 5/2005 Aubry .................... B65D 5/422 206/758
7,694,445 B2 * 4/2010 Kelly ........................ G09F 1/04 446/151
8,418,384 B2 * 4/2013 Jin ......................... A63H 33/38 40/124.02
8,465,336 B2 * 6/2013 Byrd .................... B65D 21/086 446/69
9,542,865 B2 1/2017 Simmons
10,155,173 B2 12/2018 Simmons et al.
(Continued)

FOREIGN PATENT DOCUMENTS

GB 1188838 A * 4/1970
GB 2101492 A * 1/1983 ............ A63H 33/16

*Primary Examiner* — Eugene L Kim
*Assistant Examiner* — Alyssa M Hylinski
(74) *Attorney, Agent, or Firm* — Christine Flanagan

(57) ABSTRACT

A pop-up with slide lock mechanism is provided which moves between a first position, wherein the pop-up is in a flat, unfolded position, and a second position, wherein the pop-up is in an unfolded, upright or three-dimensional (3D) configuration by sliding one panel along part of the pop-up structure.

18 Claims, 11 Drawing Sheets

(56) References Cited

U.S. PATENT DOCUMENTS

| | | | | |
|---|---|---|---|---|
| 10,252,177 | B2 | 4/2019 | Simmons et al. | |
| 10,384,143 | B2 | 8/2019 | Simmons et al. | |
| 10,434,432 | B2 | 10/2019 | Simmons et al. | |
| 10,493,372 | B2 | 12/2019 | Simmons et al. | |
| 10,682,583 | B2 | 6/2020 | Simmons et al. | |
| 10,984,680 | B1* | 4/2021 | Bowen | G09F 1/06 |
| 11,450,239 | B2* | 9/2022 | Adair | G09F 1/06 |
| 2007/0113433 | A1* | 5/2007 | Moore | G09F 1/08<br>40/124.08 |
| 2008/0127536 | A1* | 6/2008 | Carter | G09F 1/00<br>40/124.14 |
| 2009/0025263 | A1* | 1/2009 | Ross | B42D 15/042<br>493/381 |
| 2019/0091595 | A1* | 3/2019 | Pridonoff | A63H 33/008 |
| 2019/0329145 | A1* | 10/2019 | Simmons | A63H 33/42 |

* cited by examiner

POP-UP WITH SLIDE LOCK

RELATED APPLICATIONS

There are no applications related to this application.

FIELD OF THE INVENTION

This invention is in the field of social expression products such as paper cards, paper gifts, paper engineered decorations and paper pop-up items.

SUMMARY OF THE INVENTION

In accordance with the present disclosure and related inventions, a pop-up with slide lock mechanism is provided which moves between a first position, wherein the pop-up is in a flat, unfolded position, and a second position, wherein the pop-up is in an unfolded, upright or three-dimensional (3D) configuration by sliding one panel along part of the pop-up structure.

In one embodiment, a pop-up structure includes a main structure having four subpanels arranged in a square or rectangular arrangement; a roof structure comprising a panel with a bifurcating fold-line that creates a first subpanel and a second subpanel, the first subpanel having two parallel elongate slots thereon; and a faux roof panel attached to the main structure and to a portion of the first subpanel of the roof structure between the two elongate slots thereon. The faux roof panel can slide along the portion of the first subpanel of the roof structure between the two elongate slots on first subpanel or the roof structure and movement of the faux roof panel overtop the first subpanel of the roof structure along the two parallel elongate slots, causes the pop-up structure to move from a first position, wherein the pop-up structure is in a folded, substantially flat configuration, and a second position, wherein the pop-up structure is in an unfolded, upright configuration.

In another embodiment, a pop-up structure includes a main structure having an open top and four sides; a roof structure having a first panel and a second panel arranged in a pitched or A-line configuration, the roof structure attached to a top surface of the main structure forming a closed-top main structure, where the first panel of the roof structure having two elongate spaced apart slots thereon; and a faux roof panel having a open loop on an inside surface thereof which is wrapped around the portion of the first panel of the roof structure that is located between the two elongate spaced apart slots. The pop-up structure can move between a first position, wherein the pop-up structure is in a substantially flat, folded configuration and a second position, wherein the pop-up structure is in an unfolded, upright configuration, by sliding the faux roof panel along the two elongate spaced-apart slots on the first panel of the roof structure.

And in still another embodiment, a pop-up structure includes a four-paneled main structure; a two-paneled roof structure attached atop the four-paneled main structure, one of the panels of the two-paneled roof structure having two horizontal slots thereon; and a faux roof panel that is slidably attached to a portion of the two-paneled roof structure between the two horizontal slots. The pop-up structure moves between a substantially flat, folded position and an unfolded, three-dimensional configuration by sliding the faux roof panel along the two horizontal slots on the two-paneled roof structure.

DETAILED DESCRIPTION OF PREFERRED AND ALTERNATE EMBODIMENTS

The pop-up with slide lock mechanism of the present disclosure and related inventions, is designed to be stored in a substantially flat, folded position and is operable to move from the substantially flat, folded position to an upright, unfolded position with a slide lock mechanism that moves the pop-up between the folded and unfolded positions and maintains the pop-up in the upright, unfolded position for display upon a tabletop or other flat surface. The pop-up does not rely on any stand or base structure to maintain the unfolded, upright, display position.

In an exemplary embodiment, the pop-up with slide lock mechanism is a displayable item or, in one embodiment, as shown in the figures, a paper-engineered miniature house that may be a stand-alone display or may be part of a larger set of pop-up items, such as a Christmas village scene. However, the pop-up with slide lock mechanism of the present disclosure and related inventions can be any type of paper-engineered pop-up item, such as, for example, a church, a skyscraper, a barn, or any other conceivable structure.

The components of the pop-up include various die-cut pieces which are assembled together to form a particular configuration, which is, in this example, a paper-engineered miniature house. The die-cut pieces are strategically assembled by folding and interlocking and/or gluing the various die cut pieces together. The resulting pop-up is operative to move between a first position, wherein it is folded into a substantially flat configuration, and a second position, wherein it is unfolded into an unfolded, upright, three-dimensional (3D) configuration. The slide lock element enables both movement of the pop-up between the first and second positions and allows the pop-up to be self-maintained in the second, unfolded, upright, 3D configuration without the use of any outside tool or base element. The slide-lock is also hidden from view when the pop-up is in the second position. The components or die-cut shapes/pieces of the pop-up include, but are not limited to a main structure (house walls) 10, a roof structure 12, a faux roof panel 14, an internal structure 16, various mounting tabs T, and various auxiliary die-cut shapes/pieces M.

Figure 1:
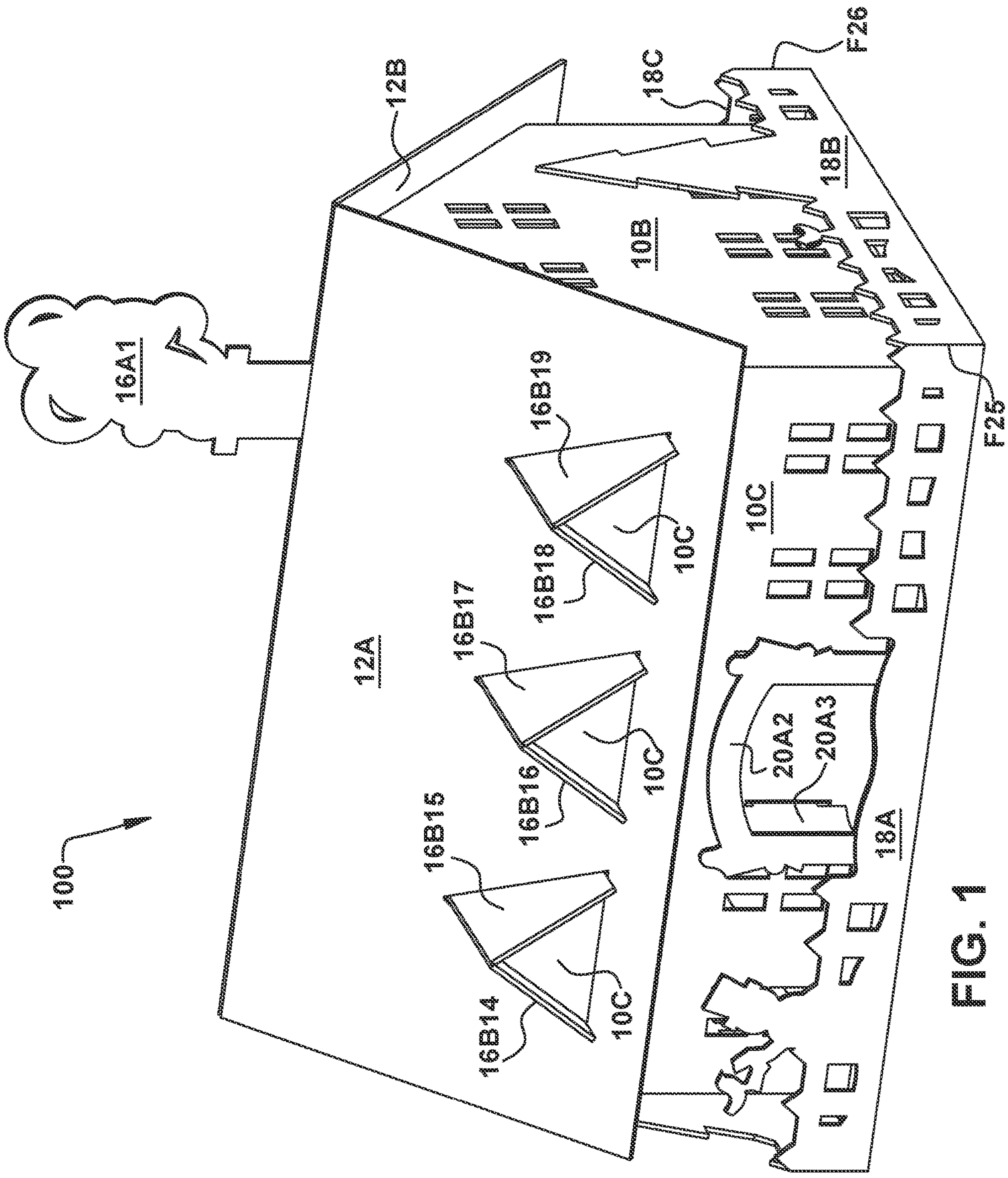
FIG. 1 is a front perspective view of the pop-up of the present invention, in an open position.
Figure 2:
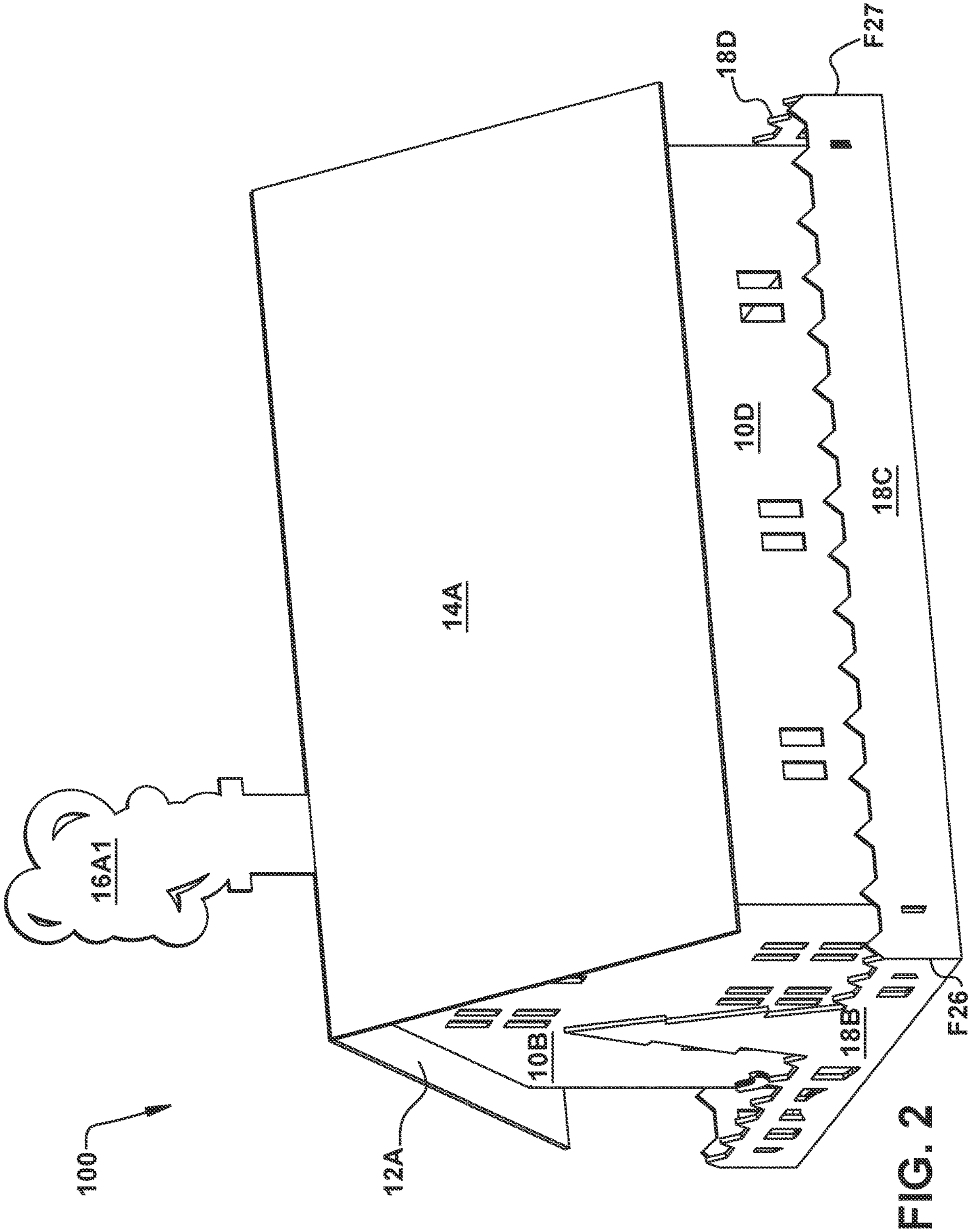
FIG. 2 is a rear perspective view of FIG. 1.
Figure 11:
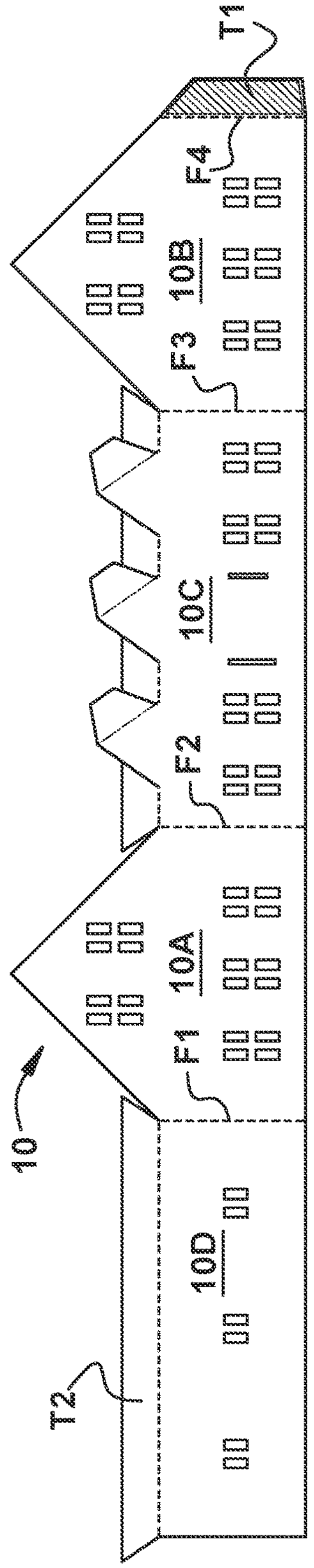
FIG. 11 is a front view of the pre-assembled main structure of the pop-up of the present invention.
Figure 12:
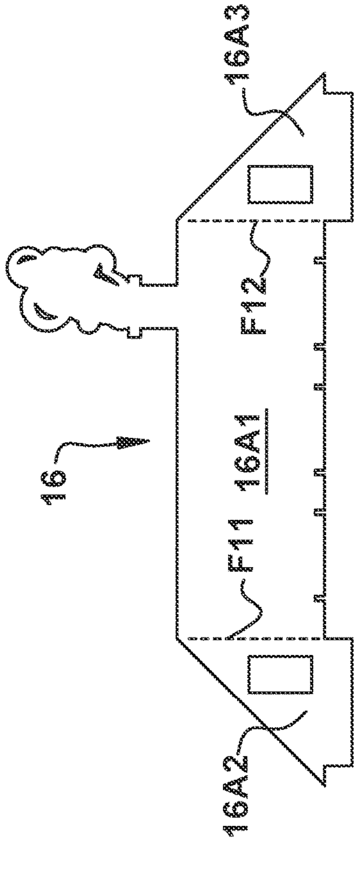
FIG. 12 is a front view of the pre-assembled faux roof structure.

The main structure 10 represent the four (4) outer walls of the pop-up, as shown in FIGS. 1, 2 and 11. The main structure 10 includes a first side panel 10A, a second side panel 10B, opposite the first side panel 10A, a front panel 10C, located between the first 10A and second 10B side panels, and a rear panel 10D, opposite the front panel, between the first 10A and second 10B side panels. Each of the four panels 10A, 10B, 10C, and 10D each have an outside surface and an inside surface opposite the outside surface. The four (4) panels are connected and separated by vertical fold lines. The rear panel 10D is attached to the first side panel 10A along fold line F1. The first side panel 10A is attached to the front panel 10C along fold line F2. The front panel 10C is attached to the second side panel 10B along fold line F3. The second side panel 10B is attached to a mounting tab T1 along vertical fold line F4. Mounting tab T1 attaches to the inside surface of the rear panel 10D to form the four (4) outer walls of the pop-up. The rear panel 10D is attached along an upper edge thereof to attachment tab T1, along horizontal fold line F5, which will be used to attach the roof structure 12 to the main structure 10, as discussed in further detail below. Rear panel 10D also contains to vertical slots thereon 10S which interlock with a door structure 20, also discussed in further detail below. Each of the four panels 10A, 10B, 10C, 10D of the main structure 10 may have various cutouts C thereon to represent doors, windows, or other such features.

Another component of the pop-up 100 is the roof structure 12, shown in FIGS. 1, 2, 6, 7, and 17. A first roof panel 12A and a second roof panel 12B are attached and separated by horizontal fold line F6. The horizontal fold line F6 does not extend along the complete length of the roof panels 12A, 12B, therefore, a portion of the panels 12A, 12B are unattached. The first roof panel 12A contains three (3) triangular cutouts C thereon. These cutouts C represent upstairs windows but also interconnect with the interior structure 16, which will be discussed in further detail below. The second roof panel 12B contains two (2) horizontal, elongate slots thereon S. Each of the two (2) slots S is substantially shaped like an oar with a first side S1 having a thicker width that tapers to a skinnier width at the second side S2.

Figure 4:
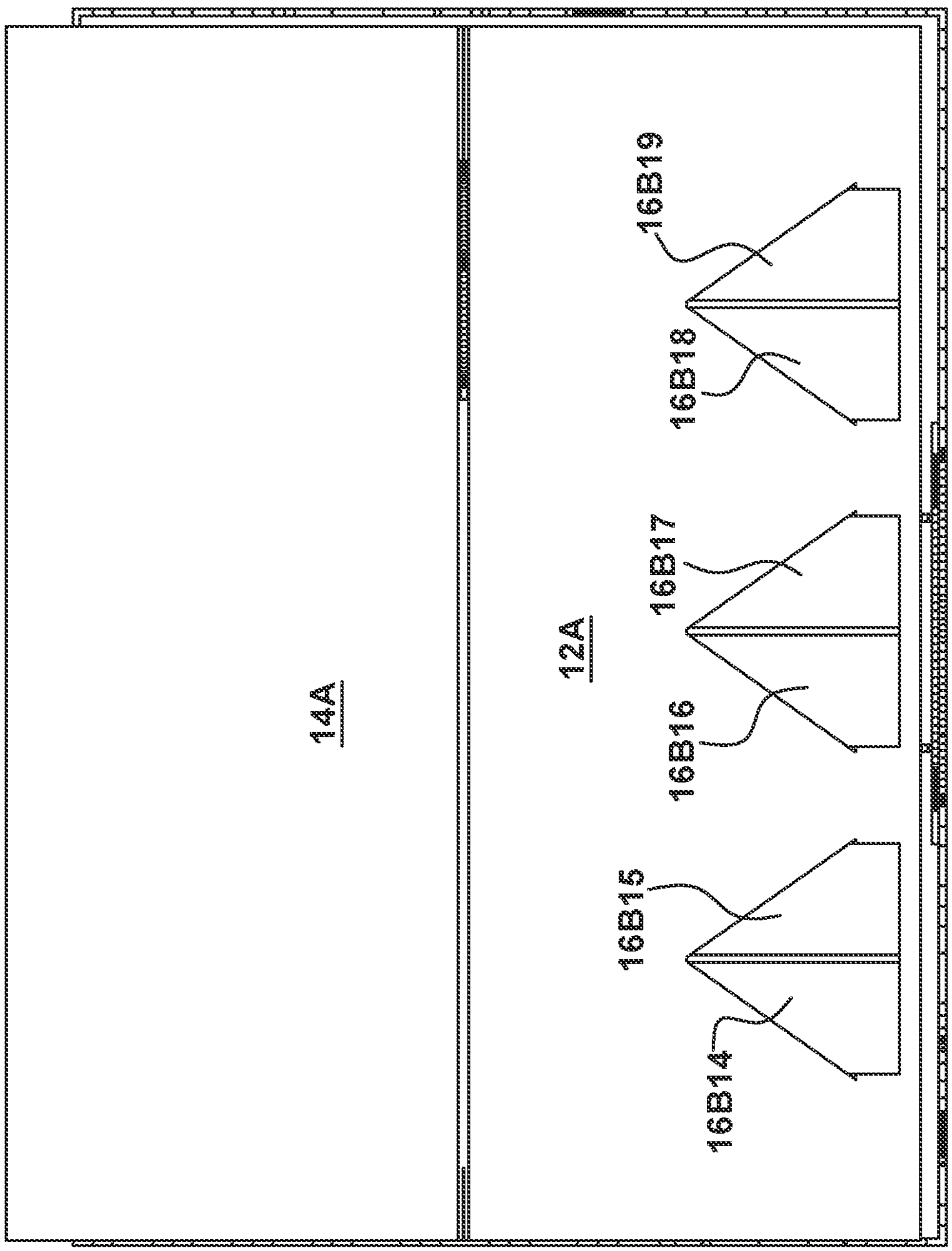
FIG. 4 is a top down view of FIG. 1.
Figure 5:
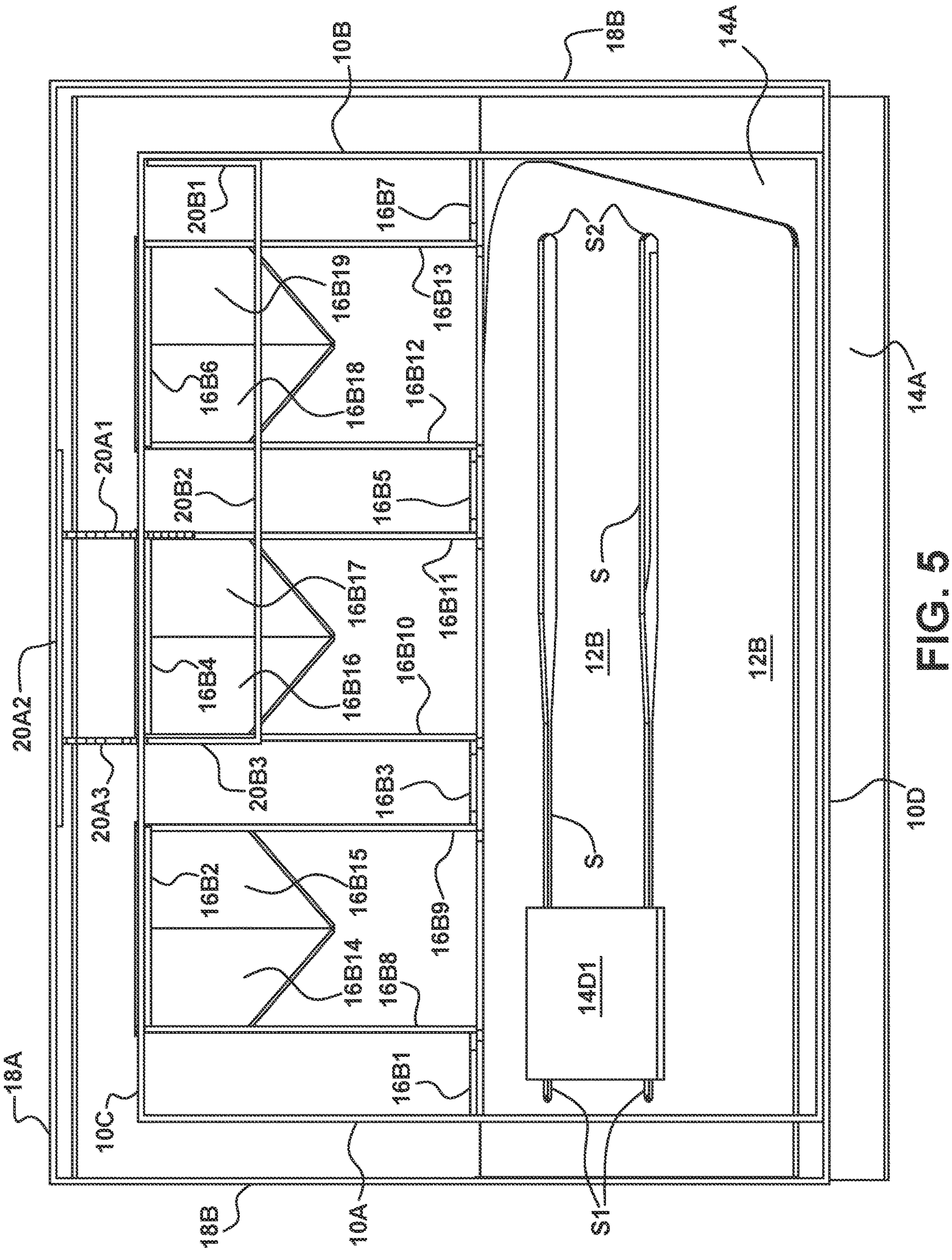
FIG. 5 is a bottom up view of FIG. 1.
Figure 6:
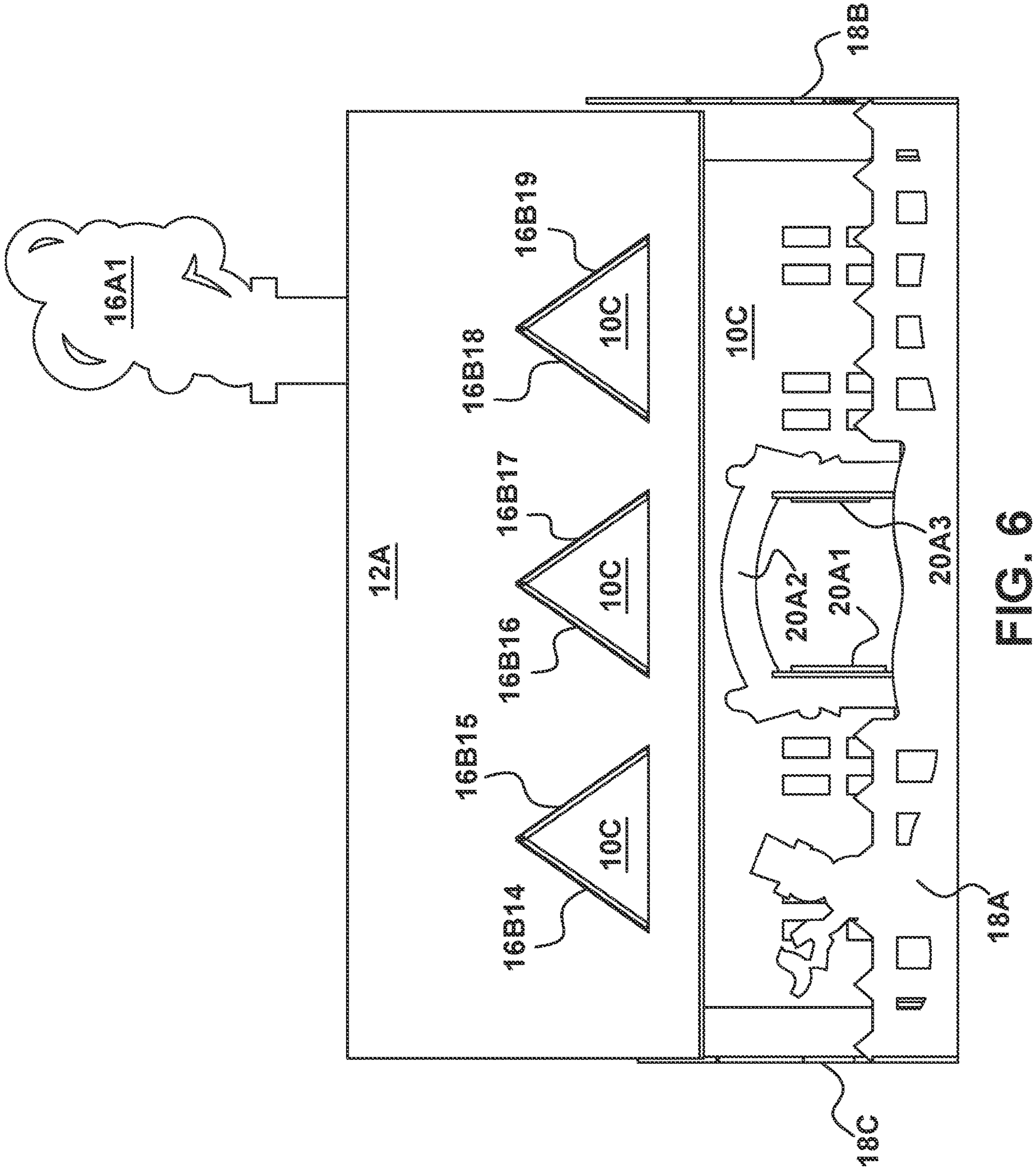
FIG. 6 is a front view of FIG. 1.
Figure 7:
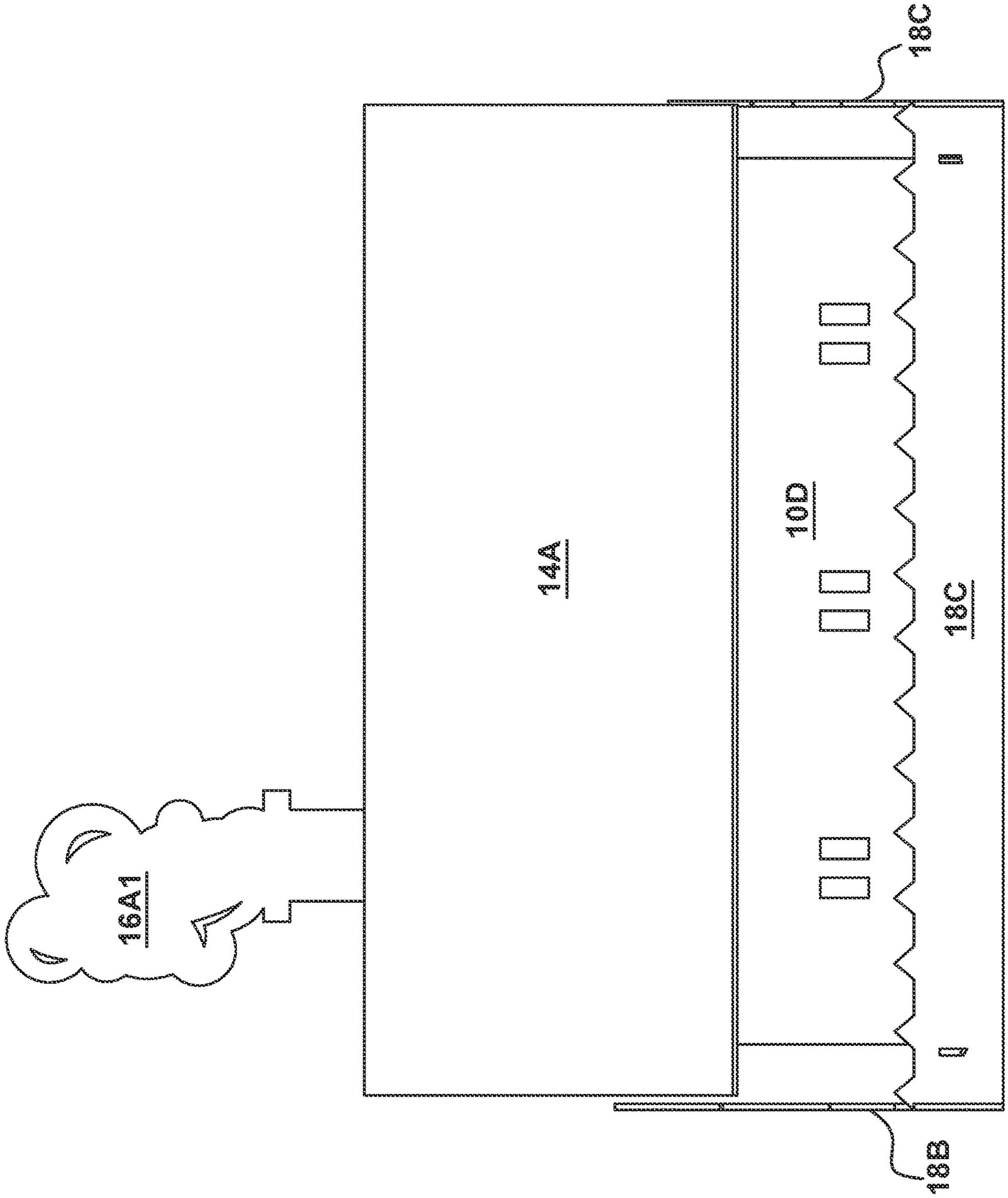
FIG. 7 is a rear view of FIG. 1.
Figure 9:
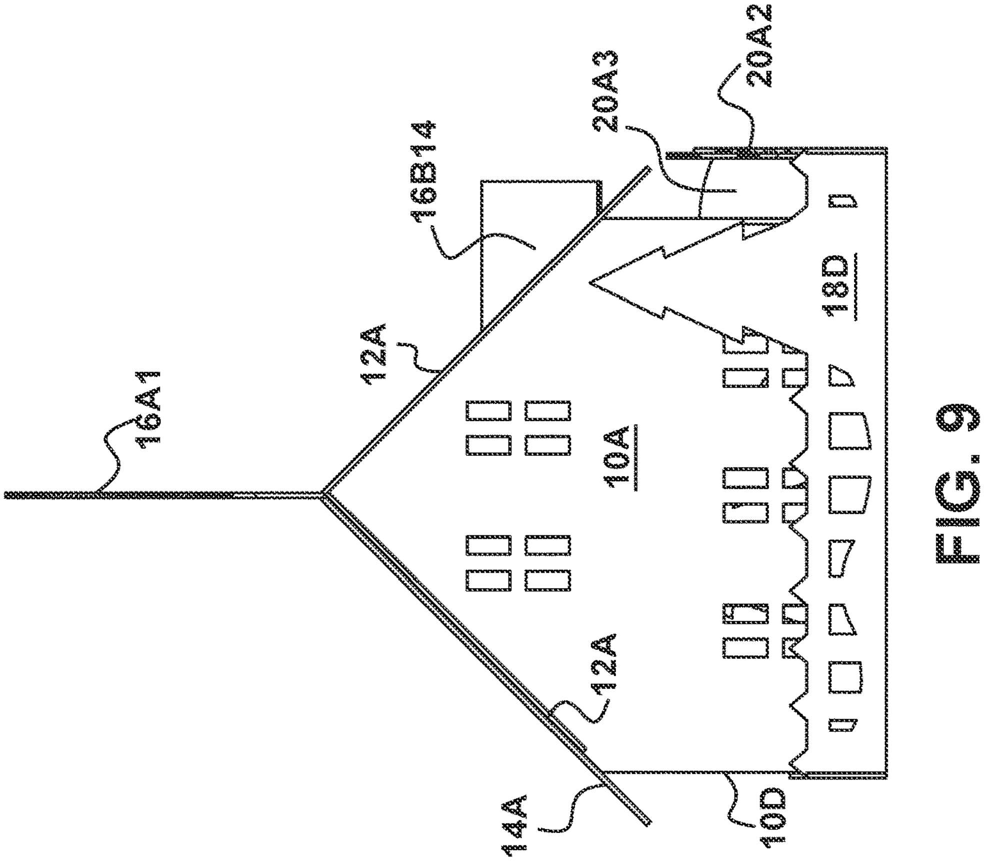
FIG. 9 is a left side view of FIG. 1.
Figure 8:
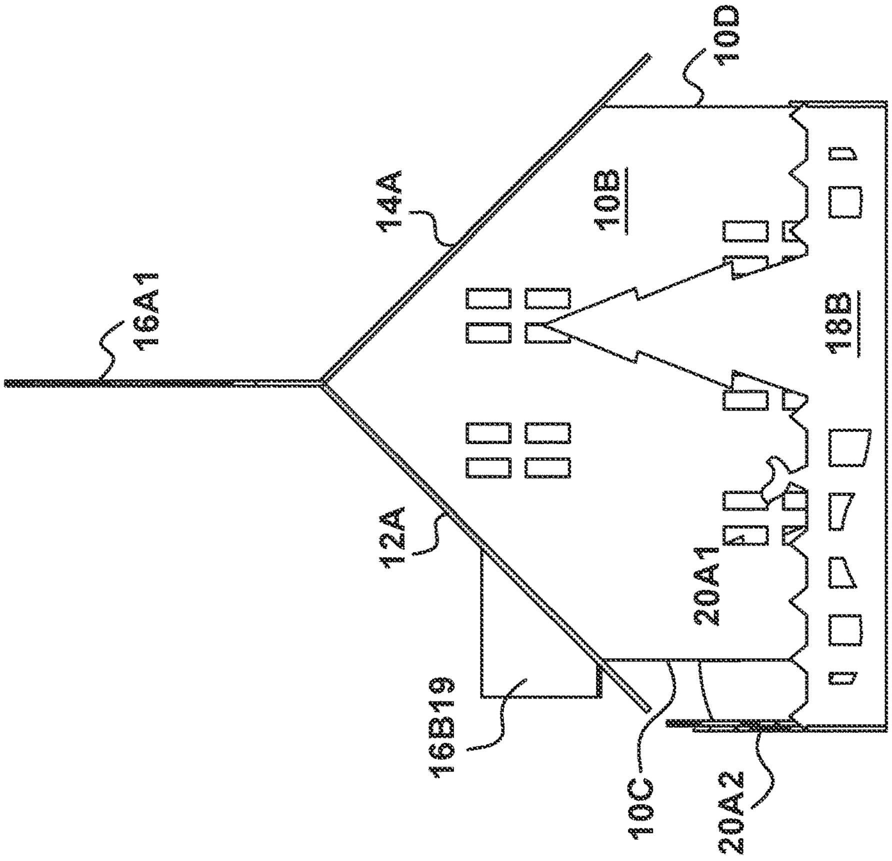
FIG. 8 is a right side view of FIG. 1.
Figure 18:
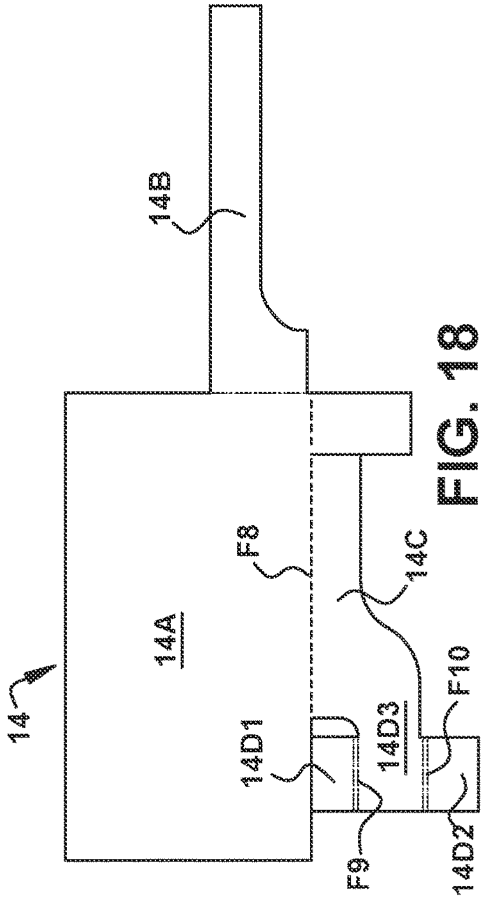
FIG. 18 is a front view of the pre-assembled faux roof structure.

A faux roof panel 14, as shown in FIGS. 2, 4, and 18 is part of the slide lock mechanism. When the pop-up is moved between the first (folded) position to the second (unfolded) position, the faux roof panel 14 slides over the top of the second roof panel 12B (along the length of the elongate slots S on the roof panel 12B) to conceal the slide lock mechanism which exists between roof panel 12B and "faux" roof panel 14. As noted above, the first roof panel 12A and 5 the second roof panel 2B are attached to each other (along fold line F6) to form an A-line pitched roof structure 12 or the "real" roof structure. However, because the "faux" panel 14 is able to slide directly over and atop roof panel 12B when the pop-up 100 is in the second, unfolded position, the "faux" panel 14 appears to be the "real" roof panel and the mechanics (slider panel and connections thereto) of the slide-lock are concealed from view. The faux roof panel 14 includes a main panel 14A, which is connected with a first flange 14B, and a second flange 14C. The main faux roof panel 14A is attached to the first flange 14B along vertical fold line F7 and to the second flange 14C along horizontal fold line F8. The first flange 14B is a support panel that assists in keeping the faux roof panel 14 from separating or moving away from second roof panel 12B when the pop-up 100 is in the second, unfolded position. The second flange 14C contains, at one end, a tab 14D having two minor fold lines thereon F9, F10, creating three (3) subpanels 14D1, 14D2, 14D3. These subpanels 14D1, 14D2, 14D3 fold together and interconnect with a portion of the roof structure 12 to enable the slide movement that moves the pop-up 100 between the first (folded) and the second (unfolded) positions and to lock the pop-up 100 in the second (unfolded) position, as discussed in further detail below.

Figure 3:
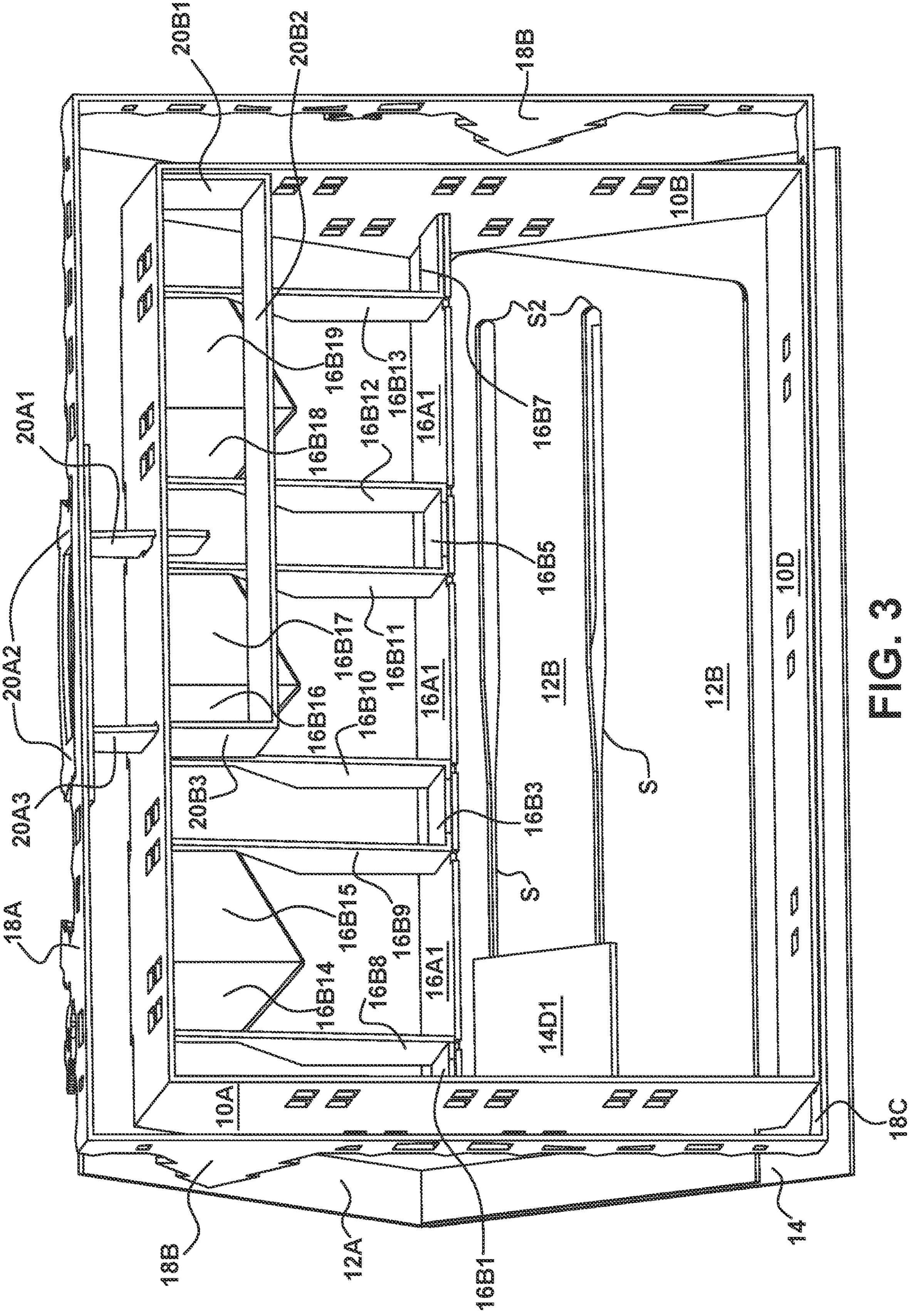
FIG. 3 is a bottom perspective view of FIG. 1.
Figure 14:
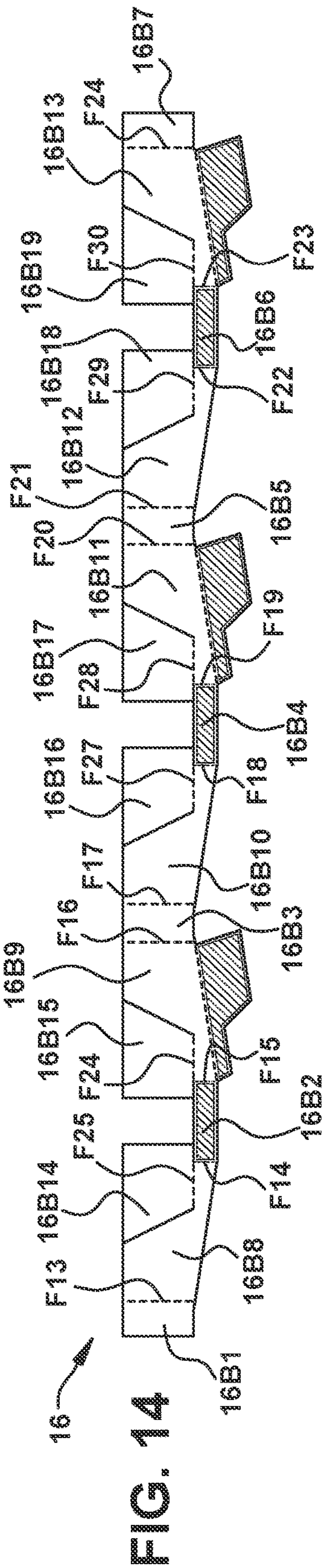
FIG. 14 is a front view of the pre-assembled internal structure.

An internal structure 16, as shown in FIGS. 3 and 14, is significantly concealed within the pop-up 100 when the pop-up is in the second (unfolded) position. It also moves between first (folded) and second (unfolded) positions along with the pop-up 100 and includes a central panel 16A and a serpentine panel 16B. These panels 16A, 16B interconnect with the other components of the pop-up 100 to create 3D features when the pop-up 100 is moved into the second, unfolded position. The central panel 16A contains two fold lines F11, F12 which separate the central panel 16A into three (3) subpanels—the main support panel 16A1, a first mounting panel 16A2 and a second mounting panel 16A3. The main support panel 16A1 has an extended portion that extends upward from the roof portion, through area where roof panels 12A, 12B are not connected. The extended portion may be shaped like a chimney or smokestack to complement the miniature house theme of the exemplary pop-up 100 that is shown in the figures. The serpentine panel 16B includes various fold lines and subpanels that wind through the inside surface of the main structure 10. The serpentine panel 16B contains seven (7) mounting panels 16B1-16B7, six (6) support panels 16B8-16B13, and six (6) interface panels 16B14-16B19. Mounting panels 16B1, 16B3, 16B5, and 16B7 are connected to the central panel 16A of the internal structure 16 and mounting panels 16B2, 16B4, and 16B6 are connected to the front panel 10C of the main structure 10 (to be discussed in further detail below). Mounting panel 16B1 is attached to support panel 16B8 along fold line F13; support panel 16B8 is attached to mounting panel 16B2 along fold line F14; mounting panel 16B2 is attached to is attached to support panel 16B9 along fold line F15; support panel 16B9 is attached to mounting panel 16B3 along fold line F16; mounting panel 16B3 is attached to support panel 16B10 along fold line F17; support panel 16B10 is attached to mounting panel 16B4 along fold line F18; mounting panel 16B4 is attached to support panel 16B11 along fold line 19; support panel 16B11 is attached to mounting panel 16B5 along fold line F20; mounting panel 16B5 is attached to support panel 16B12 along fold line F21; support panel 16B12 is attached to mounting panel 16B6 along fold line F22; mounting panel 16B6 is attached to support panel 16B13 along fold line F23; and support panel 16B13 is attached to mounting panel 16B7 along fold line 24. The support panels 16B8-16B13 are connected between each pair of mounting panels such that support panel 16B8 exists between mounting panels 16B1 and 16B2; support panel 16B9 exist between mounting panels 16B2 and 16B3; support panel 16B10 exists between mounting panels 16B3 and 16B4; support panel 16B11 exists between mounting panels 16B4 and 16B5; support panel 16B12 exists between mounting panels 16B5 and 16B6; and support panel 16B13 exists between mounting panels B6 and B7. Each of the interface panels 16B14-16B19 are at least partially attached to a support panel 16B8-16B13 along angled fold lines F25-F30 such that interface panel 16B14 is attached to support panel 16B8 along fold line F25; interface panel

16B15 is attached to support panel 16B9 along fold line F26; interface panel 16B16 is attached to 16B10 along fold line F27; interface panel 16B17 is attached to support panel 16B11 along fold line F28; interface panel 16B18 is attached to support panel 16B12 along fold line F28; interface panel 16B18 is attached to support panel 16B12 along fold line F29; and interface panel 16B19 is attached to support panel 16B13 along fold line F30. Each pair of interface panels that are positioned between the same mounting panel are folded toward one another into a substantially A-line configuration when the pop-up 100 is in the second (unfolded) position (interface pairs 16B14 and 16B15; 16B16 and 16B17; and 16B18 and 16B19). In addition to each pair of interface panels being configured as a separate A-line structure, at least a portion of each interface panel extends outward through at least one of the three triangular cutouts C in the first roof panel 12A, when the pop-up 100 is in the second (unfolded) position. The internal structure 16 provides increased support and stability to the pop-up 100 and also aids in or enforces maintaining the pop-up 100 in the second (unfolded) position. However, the pop-up 100 does not rely on the internal structure 16 for primary stability, support, or locking mechanism. Also, when the pop-up 100 is in the second (unfolded) position, the internal structure 16 does not come into contact with the table, desk or other substantially flat surface upon which the pop-up 100 is placed.

To assemble the pop-up 100, the main components—the main structure 10 (FIG. 11), the roof structure 12 (FIG. 17), the faux roof panel 14 (FIG. 18), and the internal structure 16 (FIG. 14) are each strategically folded along the various fold lines and attached together via the many mounting tabs. The components must also be interconnected to one another. While this disclosure discusses the assembly of each main component and the interconnection of each component to form the pop-up 100, these assembly steps may, in some cases, be performed in a different order. For ease of understanding, this disclosure will describe how each particular main component is separately configured and then will disclose how each of the main components are connected together to form the resulting pop-up 100. For example, the internal structure 16 may be attached to main structure 10 before the four (4) panels of the main structure 10 are attached together. Also, the roof assembly 12 may be constructed prior to the main structure 10. In essence, in some cases, some main components may first be connected together before being fully assembled and the order in which the assembly is described herein does not limit the specification to assembling the components in any particular order. Certain operations may be more convenient to perform in a particular order but may otherwise be performed outside of that order as well.

The four (4) panels of the main structure 10 are assembled by folding the panels 10A, 10B, 10C, 10D along fold lines F1, F2, F3, and F4. The four (4) panels will eventually be closed to create, a four (4) sided structure (with open top) by attaching subpanel 10B to subpanel 10D via mounting tab T1.

The roof structure 12 is folded along fold line F6 to create an A-line shape which resembles a pitched roof. The roof structure 12 will eventually be attached to the main structure 10 by attaching the outer surface of mounting tab T2 (on the main structure 10) to the inside surface (at a lower edge thereof) to the first roof panel 12A (to be discussed in further detail below).

The faux roof panel 14, as noted above, contains a second flange 14C which is folded over fold line F8 to lie atop and attach to the main faux roof panel 14A. The first flange 14B then gets folded over the second flange 14C. The second flange 14C contains a tab 14D at one end with two (2) minor fold lines F9, F10 which creates three (3) subpanels 14D1, 14D2, 14D3. Subpanels 14D1 and 14D2 are folded along fold lines F9 and F10 respectively, however they are not attached to one another until they are wrapped around the first flange 14B and the portion of roof panel 12B that is located between the slots S located thereon.

The internal structure 16 is assembled by folding the serpentine panel 16B along the various fold lines, forming a particular serpentine shape that, when fully assembled, extends between the walls of the main structure 10 and attaches the main structure 10 to the central panel 16A of the internal structure 16. To configure the serpentine panel 16B for attachment to the central panel 16A and insertion into the main structure 10, mounting tab 16B1 is folded approximately 90-degrees in a first vertical direction along fold line F13 such that support panel 16B8 is perpendicular to the central panel 16A; support panel 16B8 is folded approximately 90-degrees in a first horizontal direction along fold line F14 such that mounting tab 16B2 is parallel to the central panel 16A; mounting tab 16B2 is folded approximately 90-degrees in a second vertical direction along fold line F15 such that support panel 16B9 is perpendicular to the central panel 16A; support panel 16B9 is folded approximately 90-degrees in a first horizontal direction along fold line F16 such that mounting tab 16B3 is parallel to the central panel 16A; mounting tab 16B3 is folded approximately 90-degrees in a first vertical direction along fold line F17 such that support panel 16B10 is perpendicular to the central panel 16A; support panel 16B10 is folded approximately 90-degrees in a first horizontal direction along fold line F18 such that mounting tab 16B4 is parallel to the central panel 16A; mounting tab 16B4 is folded approximately 90-degrees in a second vertical direction such that support panel 16B11 is perpendicular to the central panel 16A; support panel 16B11 is folded approximately 90-degrees in a first horizontal direction such that mounting panel 16B5 is parallel to the central panel 16A; mounting panel 16B5 is folded approximately 90-degrees in a second vertical direction such that support panel 16B12 is perpendicular to the central panel 16A; support panel 16B12 is folded approximately 90-degrees in a first horizontal direction such that mounting tab 16B6 is parallel to the central panel 16A; mounting tab 16B6 is folded approximately 90-degrees in a second vertical direction such that support tab 16B13 is perpendicular to the central panel 16A; support tab 16B13 is folded approximately 90-degrees in a first horizontal direction such that mounting tab 16B7 is parallel to the central panel 16A. As noted above, each of the interface panels 16B14-16B19 on the serpentine panel 16 are at least partially attached to a support panel 16B8-16B13 along angled fold lines F25-F30. Each pair of interface panels that are positioned between the same mounting panel are folded toward one another into a substantially A-line configuration.

After assembling, or partially assembling, where necessary, each individual component, the components must be combined to form the pop-up 100.

Once the serpentine panel 16B has been configured, mounting panels 16B1, 16B3, 16B5, and 16B7 are glued to the central panel 16A and the mounting panels 16B2, 16B4, and 16B6 are glued to subpanel 10C of the main structure 10. Subpanel 16A2 of the central panel 16A is folded approximately 90-degrees such that it is perpendicular to subpanel 16A1 and subpanel 16A3 is folded approximately 90-degrees such that it is perpendicular to subpanel 16A1.

Subpanels 16A2 and 16A are glued to subpanels 10A and 10B of the main structure 10 respectively.

As mentioned above, subpanels 14D1 and 14D2 of the faux roof panel 14 are folded along fold lines F9 and F10 respectively. Subpanels 14D1 and 14D2 are then inserted into the slots S located on the second roof panel 12B, forming a loop around the portion of the second roof panel 12B, located between the two slots S (and the first flange 14B of the faux roof panel 14). Now the faux roof panel 14 is positioned directly atop the second roof panel 12B and it can slide (via the loop) along the length of the slots S on the second roof panel 12B.

The roof structure 12 (with faux roof panel 14 attached thereto) can now be attach directly to the main structure 10 by gluing the outer surface of mounting tab T2 (on the fourth panel 10D of the main structure 10) to an inside surface (at a lower edge thereof) of the first roof panel 12A.

The main structure 10 can also be closed (forming a substantially rectangular four (4) panel wall structure) by gluing mounting tab T1 to the inside surface of rear panel 10D.

Figure 13:
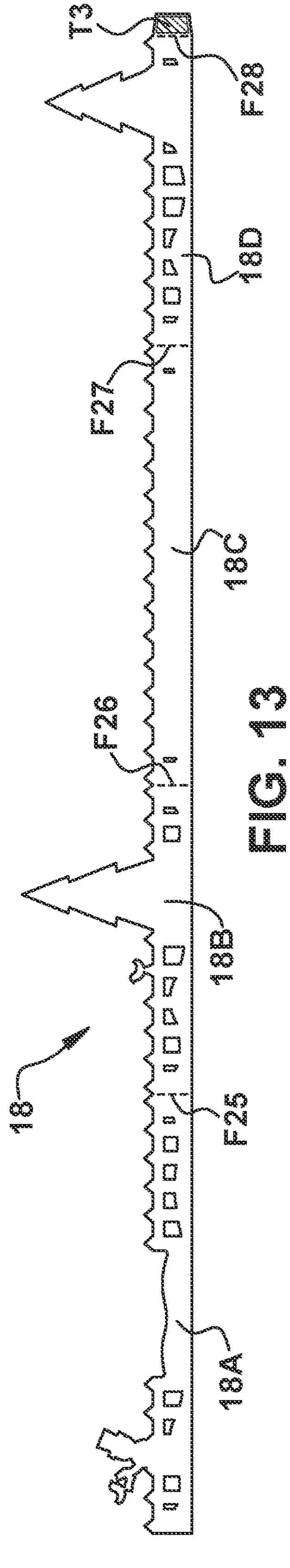
FIG. 13 is a front view of the pre-assembled fence structure.

In addition to the main components of the with slide lock 100 of the present disclosure and related inventions, the pop-up 100 may also contain minor components which make the pop-up 100 more dimensional. For example, a fence panel 18 can also be included in the pop-structure, as shown in FIG. 13. The fence panel 18 includes four (4) fold lines F25, F26, F27, and F28 which create four (4) subpanels 18A, 18B, 18C, 18D and a mounting tab T3. Subpanel 18A is attached to subpanel 18B along fold line F25; subpanel 18B is attached to subpanel 18C along fold line F26; subpanel 18C is attached to subpanel 18D along fold line F27; and subpanel 18D is attached to mounting tab T3 along fold line F28. The fence panel 18 is assembled by folding the panel along each of the fold lines to create a substantially rectangular configuration. The outer surface of mounting tab T3 is glued to the inside surface of fence subpanel 28A. The fence panel 18 is also attached to the main structure 10 by gluing the inside surface of fence subpanel 18C to the outside surface of main structure subpanel 10D.

Figure 15:
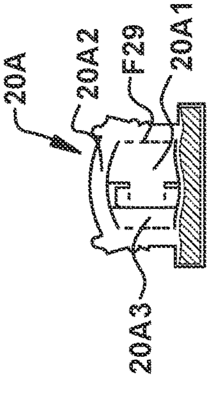
FIG. 15 and FIG. 16 are front views of the pre-assembled door structure.
Figure 16:
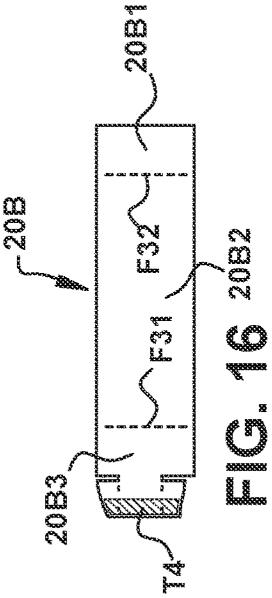
Figure 17:
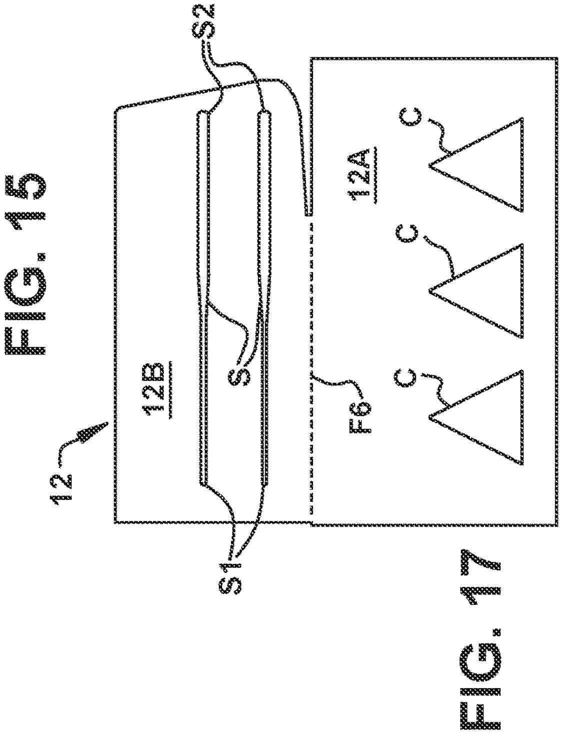
FIG. 17 is a front view of the pre-assembled roof structure.

Another auxiliary component of the pop-up structure is a door structure 20, as shown in FIGS. 15 and 16. The door structure 20 includes a front panel 20A and side panel 20B. The front panel 20A contains two (2) fold lines F29, F30 that create three (3) subpanels 20A1, 20A2, 20A3. The center subpanel 20A2 is shaped like an arched doorway with an opening at the center. The first subpanel 20A1 contains a notched tab having two (2) notches N1, N2 thereon. The third subpanel 20A3 is a mounting tab T4. The side panel 20B of the door structure 20 contains two fold lines F31, F32 that create three (3) subpanels 20B1, 20B2, 20B3. Subpanel 20B1 is a mounting tab T5 and subpanel 20B3 contains a notched end with two (2) notches thereon. Subpanel 20B3 is inserted into slot S1 (from inside the main structure 10 to outside the main structure 10) so that it projects outward from the front face of panel 10C of the main structure 10. Subpanel 20B2 is folded along fold line F31 such that subpanel 20B2 is perpendicular to subpanel 20B3. Subpanel 20B1 (also mounting tab T5) is folded along fold line F32 such that subpanel 20B1 is perpendicular to subpanel 20B2. Subpanel 20B1 is attached to the inside surface of subpanel 10B of the main structure 10. Subpanel 20A3 of the front panel 20A of the door structure 20 is attached to subpanel 20B3 of the side panel (panel that projects out from the main structure 10). The notches N1, N2 on subpanel 20A1 are inserted into the slot S2 on subpanel 10C of the main structure 10 (from outside the main structure 10 to the inside of the main structure 10). The arched portion (subpanel 20A2) then sits away from the front surface of subpanel 10C and creates a more dimensional effect.

Figure 10:
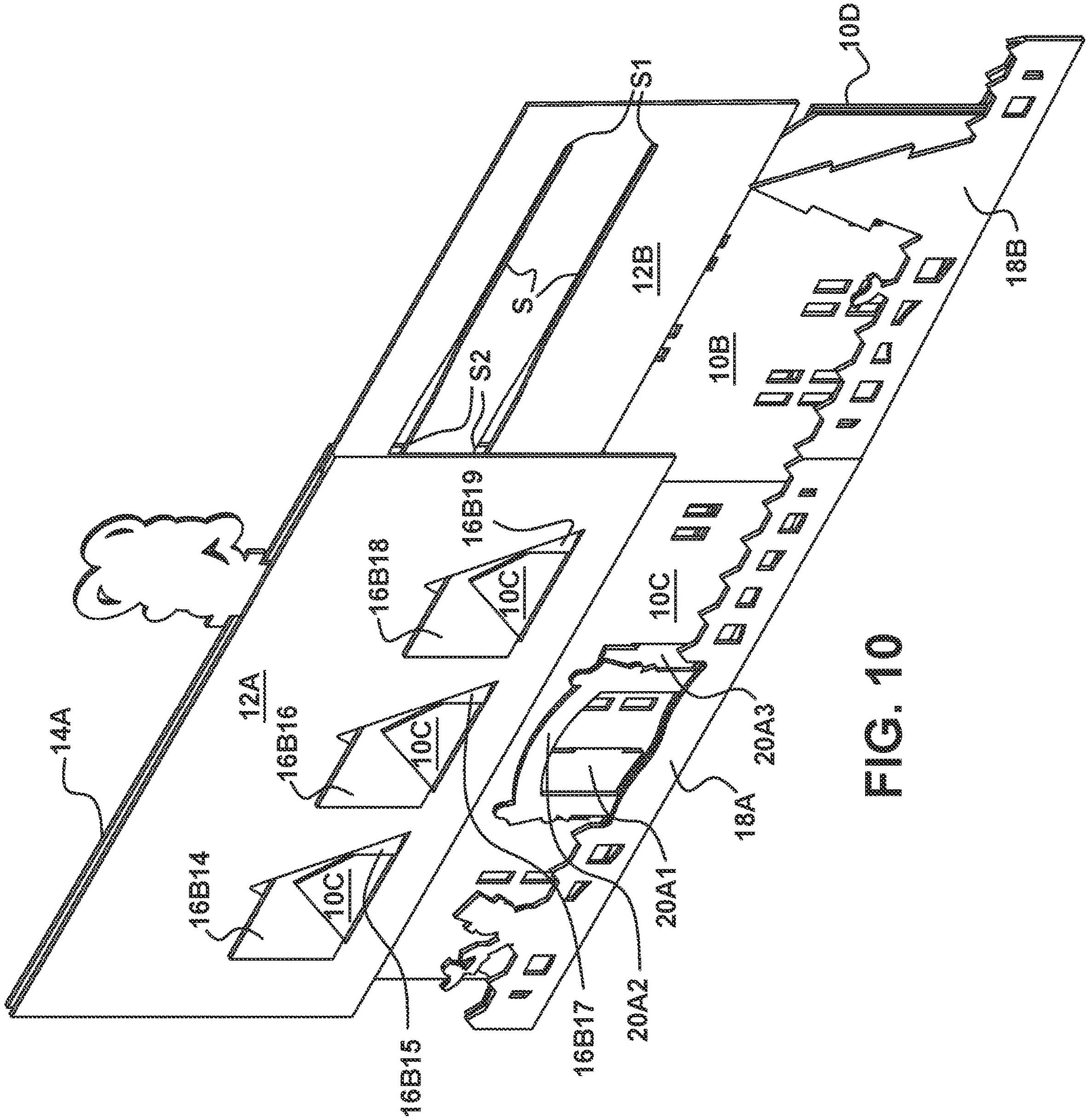
FIG. 10 is a perspective view of the pop-up of FIG. 1, in a closed position.

In operation, the pop-up with slide lock 100 of the present disclosure and related inventions begins in a first position, wherein it is in a substantially flat, folded configuration, as shown in FIG. 10. In this position, the pop-up can easily be placed into an envelope or other flat package for presentation to a recipient or for storage. From the first position, the pop-up 100 can be moved to a second position, wherein it is in an unfolded, upright, 3D configuration, as shown in FIG. 1. A user can, with one hand, grip subpanel 12B of the roof panel 12, such as, for example, between a forefinger and thumb, and with the other hand grip the faux roof panel 14 and move the panels toward one other. Subpanel 12B of the roof panel 12 slides inward (loop on the inside surface of the faux roof panel 14 slides along the slots S on subpanel 12B of the roof panel 12. As subpanel 12B slides inward, it becomes positioned beneath the faux roof panel 14 and is hidden from view. In moving the faux roof panel 14 into the second position, it unfolds the main structure 10 and the internal structure 16. When the internal structure 16 is folded into the second position, the interface panels 16B14-16B19 also move from a flat, folded position to extend outward between the three (3) triangular-shaped openings on subpanel 12A of the roof panel 12. Two interface panels (16B14/16B15, 16B16/16B17, and 16B18/16B19) protrude into each of the three (3) openings, forming an A-line shape over the three (3) triangular shapes atop subpanel 10C of the main structure 10. This creates imitation eaves on the front face of the pop-up 100 and it also secondarily assists in keeping the structure in the second, unfolded position, where it can be placed onto a table, desk, or other flat surface.

While this disclosure has used the term "glued" to describe how the various tabs and panels are attached, other attachment means may be used and still remain within the scope of this invention. Specific panels, tabs, cut-outs, fold lines and attachment points are also described herein with respect to the example embodiment, however, tabs, panels and fold lines may be in different quantities, shape, and positions than disclosed herein and still remain within the spirit of the invention.

The foregoing embodiments of the present invention are presented herein for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

The invention claimed is:

1. A pop-up structure comprising;

a main structure having four subpanels arranged in a square or rectangular arrangement;

a roof structure comprising a panel with a bifurcating fold-line that creates a first subpanel and a second subpanel, the first subpanel having two parallel elongate slots thereon;

a faux roof panel attached to the main structure and to a portion of the first subpanel of the roof structure between the two elongate slots thereon;

wherein the faux roof panel can slide along the portion of the first subpanel of the roof structure between the two elongate slots on the first subpanel of the roof structure;

wherein movement of the faux roof panel overtop the first subpanel of the roof structure along the two parallel elongate slots, causes the pop-up structure to move between a first position, wherein the pop-up structure is in a folded, flat configuration, and a second position, wherein the pop-up structure is in an unfolded, upright configuration.

2. The pop-up structure of claim 1, wherein when the pop-up structure is in the second position, the faux roof panel conceals the first subpanel and slots thereon.

3. The pop-up structure of claim 1 further comprising an internal structure that interlocks with the roof structure, wherein a portion of the internal structure emerges from one or more openings on the first subpanel of the roof structure, when the pop-up structure is moved into the second position.

4. The pop-up structure of claim 1, wherein when the pop-up structure is in the second position, it can be returned to the first position by sliding the faux roof panel away from the roof structure.

5. The pop-up structure of claim 1, wherein once the pop-up structure is moved into the second position, it remains in the unfolded, upright configuration until physically moved back into the first position.

6. A pop-up structure comprising:

a main structure having an open top and four sides;

a roof structure having a first panel and a second panel arranged in a pitched or A-line configuration, the roof structure attached to a top surface of the main structure forming a closed-top main structure;

the first panel of the roof structure having two elongate spaced apart slots thereon;

a faux roof panel having an open loop on an inside surface thereof which is wrapped around a portion of the first panel of the roof structure that is located between the two elongate spaced apart slots;

wherein the pop-up structure can move between a first position, wherein the pop-up structure is in a flat, folded configuration and a second position, wherein the pop-up structure is in an unfolded, upright configuration, by sliding the faux roof panel along the two elongate spaced-apart slots on the first panel of the roof structure.

7. The pop-up structure of claim 6, wherein when the pop-up structure is moved to the second position, it remains in the second position until physically moved back to the first position.

8. The pop-up structure of claim 6, wherein the pop-up structure is moved from the first position to the second position by moving the roof structure and faux roof panel towards each other.

9. The pop-up structure of claim 6, wherein the pop-up structure is moved from the second position back to the first position by pulling the roof structure and faux roof panel away from each other.

10. The pop-up structure of claim 6, wherein the main structure of the pop-up structure supports the pop-up structure in the second position.

11. The pop-up structure of claim 6, wherein the first panel of the roof structure is concealed beneath the faux roof panel when the pop-up structure is in the second position.

12. The pop-up structure of claim 6, further comprising an internal structure which partially protrudes through one or more openings on the second panel of the roof structure when the pop-up structure is in the second position.

13. The pop-up structure of claim 6, wherein a portion of the internal structure extends above the roof structure.

14. A pop-up structure comprising:

a four-paneled main structure;

a two-paneled roof structure attached atop the four-paneled main structure, one of the panels of the two-paneled roof structure having two horizontal slots thereon;

a faux roof panel that is slidably attached to a portion of the two-paneled roof structure between the two horizontal slots;

wherein the pop-up structure moves between a flat, folded position and an unfolded, three-dimensional configuration by sliding the faux roof panel along the two horizontal slots on the two-paneled roof structure; and wherein the faux roof panel conceals the two horizontal slots on the two-paneled roof structure when the pop-up structure is in the unfolded, three-dimensional configuration.

15. The pop-up structure of claim 14, wherein once the pop-up structure is moved into the unfolded, three-dimensional configuration it is locked into that configuration until physically moved back to the flat, folded configuration.

16. The pop-up structure of claim 14, wherein a loop on the faux roof panel is what attaches the faux roof panel to the roof structure.

17. The pop-up structure of claim 14 wherein the pop-up structure is moved between the flat, folded position and the unfolded, three-dimensional configuration by moving the faux roof panel and the two-paneled roof structure toward one another.

18. The pop-up structure of claim 17, wherein the pop-up structure is moved back into the flat, folded position from the unfolded, three-dimensional configuration by moving the faux roof panel and the two-paneled roof structure away from one another.

* * * * *